United States Patent
Miyagishima

(10) Patent No.: US 11,231,531 B2
(45) Date of Patent: Jan. 25, 2022

(54) FINDER OPTICAL SYSTEM AND IMAGING DEVICE

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

(*) Notice: Subject to any disclaimer, the term of this patent is extended or adjusted under 35 U.S.C. 154(b) by 366 days.

(21) Appl. No.: 16/246,578

(22) Filed: Jan. 14, 2019

(65) Prior Publication Data

US 2019/0258074 A1    Aug. 22, 2019

(30) Foreign Application Priority Data

Feb. 20, 2018    (JP) .............................. JP2018-028307

(51) Int. Cl.
*G02B 5/18* (2006.01)
*G03B 13/06* (2021.01)
*G02B 27/42* (2006.01)

(52) U.S. Cl.
CPC ............... *G02B 5/18* (2013.01); *G03B 13/06* (2013.01); *G02B 27/4211* (2013.01)

(58) Field of Classification Search
None
See application file for complete search history.

(56) References Cited

U.S. PATENT DOCUMENTS

| 6,414,798 B1 | 7/2002 | Koizumi |
| 2004/0136073 A1 | 7/2004 | Shiozaki et al. |
| 2009/0310220 A1 | 12/2009 | Suzuki |
| 2010/0254005 A1 | 10/2010 | Matsumoto |
| 2011/0090565 A1 | 4/2011 | Yoshida et al. |
| 2020/0354496 A1* | 11/2020 | Lane ........................ G02B 5/18 |

FOREIGN PATENT DOCUMENTS

| CA | 2548520 A1 | 6/2005 |
| CN | 1902512 A | 1/2007 |
| JP | H10-104533 A | 4/1998 |
| JP | 11044841 A * | 2/1999 |
| JP | H11-044841 A | 2/1999 |

(Continued)

OTHER PUBLICATIONS

An Office Action; "Notice of Reasons for Refusal", by the Japanese Patent Office dated Dec. 15, 2020, which corresponds to Japanese Patent Application No. 2019-027566 and is related to U.S. Appl. No. 16/246,578; with English language translation.

(Continued)

*Primary Examiner* — Darryl J Collins
*Assistant Examiner* — Tamara Y. Washington
(74) *Attorney, Agent, or Firm* — Studebaker & Brackett PC

(57) ABSTRACT

A finder optical system includes a display element and a diffractive optical element that is disposed on an eye point side of the display element so as to continue from the display element. The diffractive optical element includes a first base, a first layer that is laminated on the first base and includes a first diffractive optical surface on a surface thereof opposite to the first base, a second base, and a second layer that is laminated on the second base and includes a second diffractive optical surface on a surface thereof opposite to the second base. The first diffractive optical surface and the second diffractive optical surface are in close contact with each other.

16 Claims, 9 Drawing Sheets

(56) References Cited

FOREIGN PATENT DOCUMENTS

| | | | |
|---|---|---|---|
| JP | 2001-066522 A | | 3/2001 |
| JP | 2008-241734 A | | 10/2008 |
| JP | 2009-198961 A | | 9/2009 |
| JP | 2012-108296 A | | 6/2012 |
| JP | 2014-074814 A | | 4/2014 |
| JP | 2014-074815 A | | 4/2014 |
| JP | 2016-224238 A | | 12/2016 |
| JP | 2016224238 A | * | 12/2016 |
| WO | 2008-010560 A1 | | 1/2008 |
| WO | 2009-081831 A1 | | 7/2009 |

OTHER PUBLICATIONS

An Office Action by China National Intellectual Property Administration dated Jun. 29, 2021, which corresponds to Chinese Patent Application No. 201910125626.8 and is related to U.S. Appl. No. 16/246,578; with English language translation.

An Office Action mailed by China National Intellectual Property Administration dated Oct. 8, 2021, which corresponds to Chinese Patent Application No. 1201910125626.8 and is related to U.S. Appl. No. 16/246,578; with partial English language translation.

* cited by examiner

FINDER OPTICAL SYSTEM AND IMAGING DEVICE

CROSS-REFERENCE TO RELATED APPLICATIONS

The present application claims priority under 35 U.S.C. § 119 to Japanese Patent Application No. 2018-028307, filed on Feb. 20, 2018. The above application is hereby expressly incorporated by reference, in its entirety, into the present application.

BACKGROUND OF THE INVENTION

1. Field of the Invention

The present invention relates to a finder optical system and an imaging device.

2. Description of the Related Art

An ocular optical system is mounted on a finder of an optical device, such as a digital camera. For example, an optical system disclosed in JP2012-108296A is known as an ocular optical system in the related art. The ocular optical system disclosed in JP2012-108296A can be used in a telescope and binoculars, and is formed using a diffractive optical element. In addition, optical systems disclosed in WO2009/081831A and WO2008/010560A are known as the ocular optical system that is formed using the diffractive optical element. The ocular optical system disclosed in WO2009/081831A can be used in binoculars, a telescope, and a microscope.

SUMMARY OF THE INVENTION

In recent years, an electronic view finder has been widely used as a finder of a digital camera or the like. An electronic view finder includes a display element, such as a liquid crystal panel, which displays the image of a subject, and an ocular optical system that is used to observe the image displayed on the display element.

However, the degree of freedom in the configuration of the display element and the ocular optical system of the electronic view finder is very low. Since the number of lenses of the ocular optical system is increased in a case where specifications for the magnification of a finder is to be improved, that is, a wide angle of view is to be achieved, it is difficult to reduce the size of a finder unit. In a case where specifications are to be improved without an increase in the number of lenses, it is difficult to correct various aberrations of the finder optical system.

In terms of correcting various aberrations, it is difficult to say that the correction of the astigmatism and distortion of the ocular optical systems disclosed in JP2012-108296A and WO2009/081831A sufficiently has reached a level required in recent years. Further, it is also difficult to say that the correction of the spherical aberration, astigmatism, and distortion of the ocular optical system disclosed in WO2008/010560A sufficiently has reached a level required in recent years.

The invention has been made in consideration of the above-mentioned circumstances, and an object of the invention is to provide a finder optical system which can be suitably used in an electronic view finder and the like and of which the wide angle of view can be achieved, various aberrations can be corrected well, and the size of a finder unit can be reduced, and an imaging device including the finder optical system.

In order to achieve the object, a finder optical system according to an aspect of the invention includes a display element and a diffractive optical element that is disposed on an eye point side of the display element so as to continue from the display element. The diffractive optical element consists of a first base, a first layer that is laminated on the first base and that includes a first diffractive optical surface on a surface thereof opposite to the first base, a second base, and a second layer that is laminated on the second base and that includes a second diffractive optical surface on a surface thereof opposite to the second base. The first layer and the second layer are disposed so as to face each other, and the first diffractive optical surface and the second diffractive optical surface are in close contact with each other.

The finder optical system according to the aspect of the invention preferably further includes a positive lens which is disposed on an eye point side of the diffractive optical element so as to continue from the diffractive optical element and of which a convex surface faces an eye point side.

The finder optical system according to the aspect of the invention preferably consists of the display element, the diffractive optical element, and a plurality of lens groups that are disposed on the eye point side of the diffractive optical element. The plurality of lens groups preferably consist of a first lens group, a second lens group, and a third lens group that are arranged in this order toward the eye point side from a display element side. The first lens group consists of a positive lens, the second lens group consists of a single lens, and the third lens group includes a positive lens, which is disposed closest to the eye point side and of which a convex surface faces the eye point side, and has positive refractive power as a whole.

The finder optical system according to the aspect of the invention preferably further includes a plurality of lens groups that are disposed on the eye point side of the diffractive optical element, and Conditional expression (1) is preferably satisfied and Conditional expression (1-1) is more preferably satisfied in a case where a composite focal length from the diffractive optical element to the lens closest to the eye point side is denoted by f and a distance between a surface of the display element opposite to the eye point side and a surface of the lens, which is closest to the eye point side, facing the eye point side on an optical axis is denoted by TTL.

$$0.1 < f/TTL < 1.1 \tag{1}$$

$$0.4 < f/TTL < 0.8 \tag{1-1}$$

In the finder optical system according to the aspect of the invention, the diffractive optical element preferably includes at least one flat surface.

In the finder optical system according to the aspect of the invention, Conditional expression (2) is preferably satisfied and Conditional expression (2-1) is more preferably satisfied in a case where an absolute value of a difference between an Abbe's number of the first layer with respect to a d line and an Abbe's number of the second layer with respect to the d line is denoted by $\Delta vd$ and an absolute value of a difference between a refractive index of the first layer with respect to the d line and a refractive index of the second layer with respect to the d line is denoted by $\Delta Nd$.

$$100 < \Delta vd/\Delta Nd < 850 \tag{2}$$

$$200 < \Delta vd/\Delta Nd < 750 \tag{2-1}$$

The finder optical system according to the aspect of the invention preferably further includes a plurality of lens groups that are disposed on the eye point side of the diffractive optical element, and Conditional expression (3) is preferably satisfied and Conditional expression (3-1) is more preferably satisfied in a case where a focal length of a surface of the first layer on which the first diffractive optical surface is formed is denoted by fdoe and a composite focal length from the diffractive optical element to the lens closest to the eye point side is denoted by f.

$$1 < |fdoe|/f < 15 \qquad (3)$$

$$2 < |fdoe|/f < 10 \qquad (3\text{-}1)$$

The finder optical system according to the aspect of the invention preferably further includes a lens that is disposed on the eye point side of the diffractive optical element so as to continue from the diffractive optical element and includes at least one aspheric surface.

The finder optical system according to the aspect of the invention preferably consists of the display element, the diffractive optical element, and a plurality of lens groups that are disposed on the eye point side of the diffractive optical element. The plurality of lens groups preferably consist of a first lens group, a second lens group, and a third lens group that are arranged in this order toward the eye point side from the display element side. The first lens group consists of a positive lens, the second lens group consists of a negative lens of which a convex surface faces the eye point side, and the third lens group has positive refractive power as a whole.

The finder optical system according to the aspect of the invention preferably consists of the display element, the diffractive optical element, and four or less lenses that are disposed on the eye point side of the diffractive optical element.

The finder optical system according to the aspect of the invention preferably consists of the display element, the diffractive optical element, and a plurality of lens groups that are disposed on the eye point side of the diffractive optical element. The plurality of lens groups preferably consist of a first lens group, a second lens group, and a third lens group that are arranged in this order toward the eye point side from the display element side. The first lens group consists of a positive lens, the second lens group consists of a single lens, and the third lens group consists of two or less positive lenses of which convex surfaces face the eye point side.

In the finder optical system according to the aspect of the invention, the diffractive optical element is preferably fixed with respect to the display element during adjustment of a diopter.

An imaging device according to another aspect of the invention comprises the finder optical system according to the aspect of the invention.

"Consisting of" and "consist of" in this specification may intend to include a lens substantially not having refractive power; optical elements other than a lens, such as a stop, a filter, and a cover glass; a lens flange; a lens barrel; and the like other than described components.

"Lens group" is not limited to a structure consisting of a plurality of lenses, and may consist of only one lens.

"Single lens" means one lens that is not cemented. However, a complex aspherical lens (a lens in which a spherical lens and an aspherical film formed on the spherical lens are integrated and which functions as one aspherical lens as a whole) is treated as one lens without being regarded as a cemented lens.

The sign of refractive power and the shape of the lens surface of a lens including an aspheric surface are considered in a paraxial region unless otherwise specified. "Lens having positive refractive power" and "positive lens" are synonymous with each other. "Lens having negative refractive power" and "negative lens" are synonymous with each other.

The "focal length" used in Conditional expression is a paraxial focal length. The values of Conditional expressions are values that are obtained with respect to a d line. "d line", "C line", and "F line" described in this specification are emission lines, and the wavelength of the d line is 587.56 nm (nanometer), the wavelength of the C line is 656.27 nm (nanometer), and the wavelength of the F line is 486.13 nm (nanometer).

According to the invention, it is possible to provide a finder optical system which can be suitably used in an electronic view finder and the like and of which the wide angle of view can be achieved, various aberrations can be corrected well, and the size of a finder unit can be reduced, and an imaging device including the finder optical system.

DESCRIPTION OF THE PREFERRED EMBODIMENTS

Figure 1:
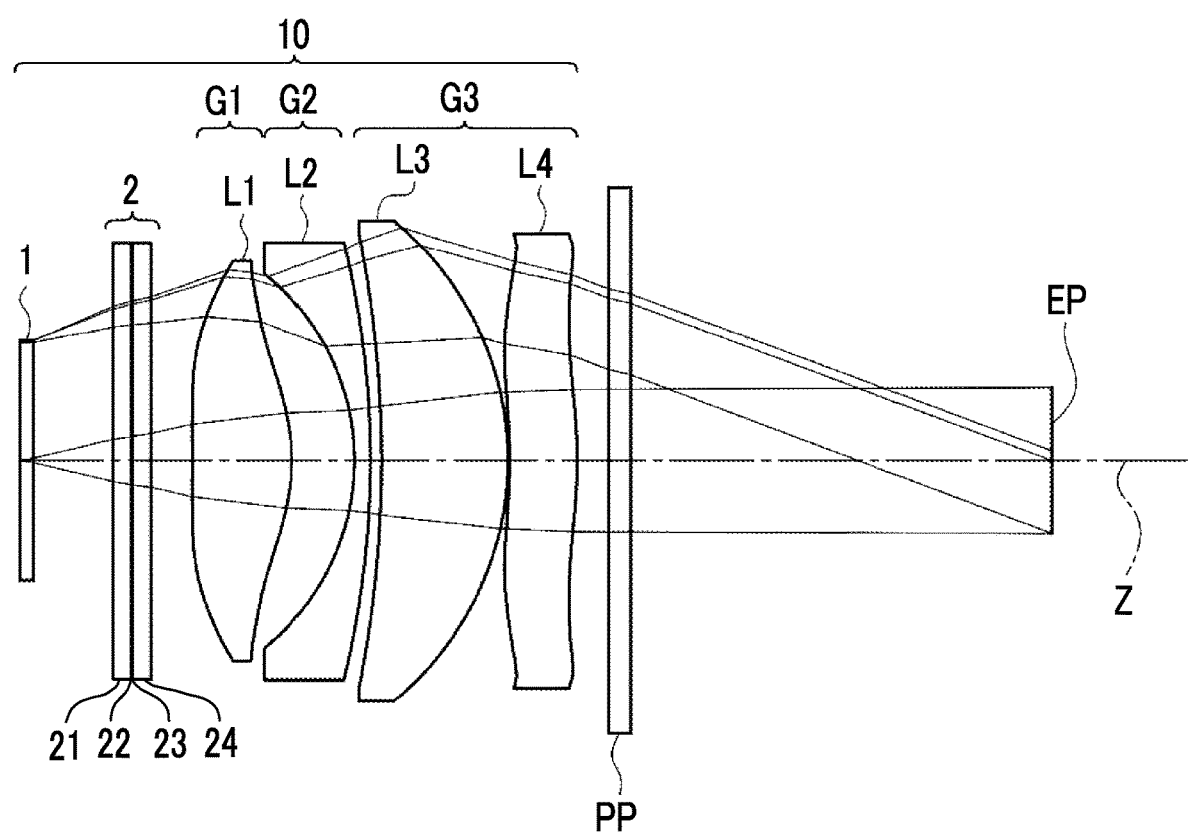
FIG. 1 is a cross-sectional view showing a configuration of a finder optical system according to an embodiment of the invention (a finder optical system of Example 1 of the invention) and luminous flux.

Embodiments of the invention will be described in detail below with reference to the drawings. FIG. 1 shows the configuration of a finder optical system 10 according to an embodiment of the invention on a cross section including an optical axis Z. An example shown in FIG. 1 corresponds to Example 1 to be described later. In FIG. 1, a left side is shown as a display element side and a right side is shown as an eye point side. An eye point EP shown in FIG. 1 is not to show a size or a shape, and is to show a position in the direction of the optical axis. Further, luminous flux that is directed to the eye point EP from a point positioned on the optical axis and a display element and luminous flux that is directed to the eye point EP from the highest point positioned on the display element are shown in FIG. 1 together.

The finder optical system 10 includes a display element 1 and a diffractive optical element 2 that is disposed on the eye point side of the display element 1 so as to continue from the display element 1. For example, a liquid crystal panel can be used as the display element 1. The finder optical system 10 can be suitably used in, for example, an electronic view finder.

For example, the finder optical system 10 can be adapted to include a plurality of lens groups disposed on the eye point side of the diffractive optical element 2 as shown in FIG. 1. The finder optical system 10 shown in FIG. 1 includes the display element 1, the diffractive optical element 2, a first lens group G1, a second lens group G2, and a third lens group G3 that are continuously arranged in this order toward the eye point side from the display element side. In the example shown in FIG. 1, the first lens group G1 consists of one lens, that is, a lens L1, the second lens group G2 consists of one lens, that is, a lens L2, and the third lens group G3 consists of two lenses, that is, a lens L3 and a lens L4.

An example in which an optical member PP having the shape of a parallel flat plate is disposed on the eye point side of the lens L4 is shown in FIG. 1. The optical member PP is a member that is assumed as a protective cover glass, various filters, or the like. The optical member PP is not an essential component and may also be omitted.

The diffractive optical element 2 is an element that has a negative dispersion value and can obtain a high effect of correcting a chromatic aberration due to high abnormal dispersibility. Since the diffractive optical element 2 is used, it is possible to reduce a load of the correction of aberrations of the other lens groups and to allow the other lens groups to focus on a reduction in the entire length of the optical system and a wide angle of view thereof. As a result, it is advantageous in correcting an aberration, reducing a size, and achieving a wide angle of view.

In the finder optical system 10 according to this embodiment, the diffractive optical element 2 is disposed closest to the display element 1. A plurality of effects to be described below can be obtained due to this disposition. Generally, the display element 1 requires a cover member, such as a cover glass. However, since the diffractive optical element 2 can be used as the cover member according to the above-mentioned disposition, a space is saved and a chromatic aberration can be corrected better without an increase in the number of lenses from the configuration in the related art. Further, since an angle between a ray incident on the diffractive optical element 2 and a direction parallel to the optical axis Z can be reduced due to the disposition, it is advantageous in terms of incident angle characteristics. Furthermore, since the diffractive optical element 2 is disposed at a position away from the eye point side, it is possible to make it difficult for a ring-shaped pattern of a diffractive optical surface to be seen. Moreover, since the diffractive optical element 2 is disposed at a position away from the eye point side, the influence of external light causing flare can be reduced.

Figure 2:
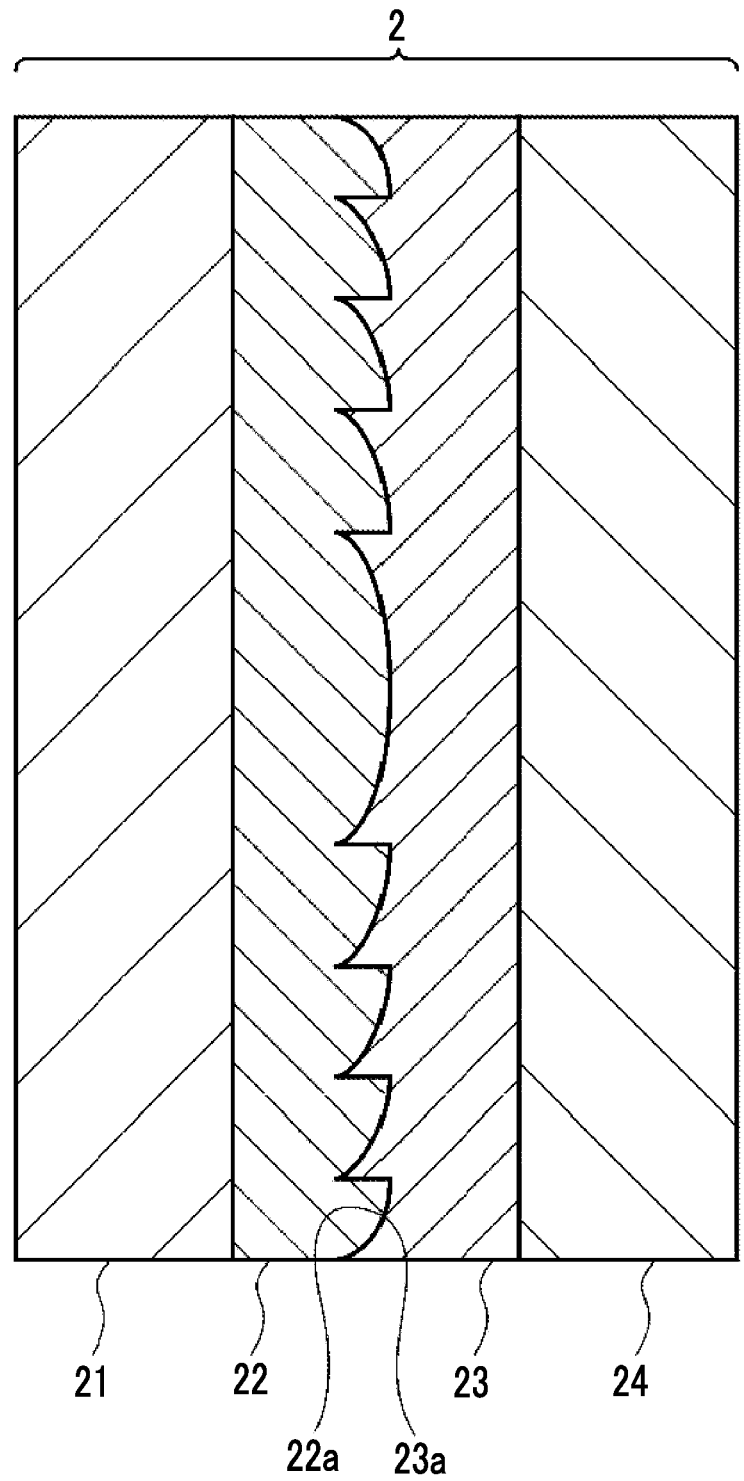
FIG. 2 is a schematic diagram showing a cross section of a diffractive optical element included in the finder optical system of FIG. 1.

The diffractive optical element 2 of this embodiment has a close-contact multilayer structure. A schematic diagram showing the cross section of the diffractive optical element 2 including the optical axis Z is shown in FIG. 2 by way of example. The diffractive optical element 2 includes a first base 21, a first layer 22, a second layer 23, and a second base 24 that are arranged in this order toward the eye point side from the display element side. The first layer 22 is laminated on the first base 21. The first layer 22 includes a first diffractive optical surface 22a on the surface thereof opposite to the first base 21. The second layer 23 is laminated on the second base 24. The second layer 23 includes a second diffractive optical surface 23a on the surface thereof opposite to the second base 24. The first layer 22 and the second layer 23 are disposed so as to face each other. Diffraction grating grooves, which are mated with each other, are formed on the first diffractive optical surface 22a and the second diffractive optical surface 23a. For example, ring-shaped diffraction grating grooves having a center on the optical axis Z are formed in the example shown in FIG. 1. The first diffractive optical surface 22a and the second diffractive optical surface 23a are in close contact with each other. The thickness of each base, the thickness of each layer, and the shape of each diffractive optical surface do not need to be necessarily accurate and are schematically shown in FIG. 2.

It can be thought in the diffractive optical element 2 that the first base 21 and the first layer 22 form a first diffractive component, the second base 24 and the second layer 23 form a second diffractive component, and the first diffractive component and the second diffractive component are in close contact with each other with the respective diffractive optical surfaces therebetween as an interface. Since the diffractive optical element 2 includes a plurality of diffractive components, diffraction efficiency at wavelengths other than a design wavelength can be improved. Further, since the first diffractive optical surface 22a and the second diffractive optical surface 23a are in close contact with each other, flare caused by external light can be reduced and diffraction efficiency can be improved.

It is preferable that the diffractive optical element 2 includes at least one flat surface. Since the diffractive optical element 2 includes a flat surface, the diffractive optical element 2 can be built in the display element 1. Accordingly, it can be expected that the finder optical system is reduced in size. For example, both surfaces of the first base 21 and both surfaces of the second base 24 are flat surfaces in the example shown in FIG. 1. It is preferable that, particularly, the surface of the first base 21 facing the display element side is a flat surface as described above. However, at least one of the surface of the first base 21 facing the eye point side or the surface of the second base 24 facing the display element side may be a curved surface as necessary.

For example, glass can be used as the material of the first base 21. For example, a resin can be used as the material of the first layer 22. For example, glass can be used as the material of the second base 24 likewise. For example, a resin can be used as the material of the second layer 23. However, materials different from each other are used as the materials of the first and second layers 22 and 23.

Specifically, in a case where the absolute value of a difference between the Abbe's number of the first layer 22 with respect to the d line and the Abbe's number of the second layer 23 with respect to the d line is denoted by $\Delta vd$ and the absolute value of a difference between the refractive index of the first layer 22 with respect to the d line and the refractive index of the second layer 23 with respect to the d line is denoted by $\Delta Nd$, it is preferable that the materials are selected so as to satisfy Conditional expression (2). Further, it is more preferable that the materials are selected so as to satisfy Conditional expression (2-1).

$$100 < \Delta vd/\Delta Nd < 850 \qquad (2)$$

$$200 < \Delta vd/\Delta Nd < 750 \qquad (2\text{-}1)$$

In a case where Conditional expression (2) is satisfied, an excessive increase in the height of a relief pattern on the diffractive optical surface can be suppressed and a decrease in diffraction efficiency at wavelengths other than a design wavelength can be suppressed. Better characteristics can be obtained in a case where the finder optical system is adapted to satisfy Conditional expression (2-1).

It is preferable that the first lens group G1 has positive refractive power. The first lens group G1 can be adapted to consist of one lens L1 as shown in FIG. 1. In this case, it is preferable that the lens L1 is a positive lens of which the convex surface faces the eye point side. In a case where the lens surface of the lens L1 facing the eye point side is formed in a convex shape, it is advantageous in correcting distortion and reducing the entire length of the finder optical system 10.

As shown in FIG. 1, the lens L1 is a lens that is disposed on the eye point side of the diffractive optical element 2 so as to continue from the diffractive optical element 2. It is preferable that the lens L1 includes at least one aspheric surface. In this case, high-order astigmatism, a high-order spherical aberration, and high-order distortion are easily corrected.

It is preferable that the second lens group G2 consists of a single lens for a reduction in size. In the example shown in FIG. 1, the second lens group G2 consists of one lens L2. The lens L2 forming the second lens group G2 may be a negative lens of which the convex surface faces the eye point side. Since the finder optical system 10 includes the negative lens, the wide angle of view of the finder optical system 10 is easily achieved due to the divergent power of the negative lens. Further, since the lens surface of the negative lens, which forms the second lens group G2, facing the eye point side is formed in a convex shape, the entire length of the optical system can be reduced while the generation of a spherical aberration is suppressed.

It is preferable that the third lens group G3 has positive refractive power as a whole to reduce the entire length of the finder optical system 10. It is preferable that the third lens group G3 includes a positive lens which is disposed closest to the eye point side and of which the convex surface faces the eye point side. In a case where a positive lens is used as a lens closest to the eye point side, it is advantageous in reducing the entire length of the finder optical system 10. Further, in a case where the lens surface, which faces the eye point side, of a lens closest to the eye point side is formed in a convex shape, the generation of a spherical aberration can be suppressed.

Furthermore, it is preferable that the third lens group G3 consists of two or less positive lenses of which the convex surfaces face the eye point side. In this case, the entire length of the finder optical system 10 can be reduced while the generation of a spherical aberration is suppressed.

It is preferable that the number of lenses, which are disposed closer to the eye point side than the diffractive optical element 2 and form the finder optical system 10, is four or less to reduce the size of the finder optical system 10. It is preferable that the number of lenses, which are disposed closer to the eye point side than the diffractive optical element 2 and form the finder optical system 10, is set to three or four to reduce the size of the optical system while correcting an aberration well.

In a case where a composite focal length from the diffractive optical element 2 to the lens closest to the eye point side is denoted by f and a distance between the surface of the display element 1 opposite to the eye point side and the surface of the lens, which is closest to the eye point side, facing the eye point side on the optical axis is denoted by TTL in the configuration where the finder optical system 10 includes the display element 1, the diffractive optical element 2, and the plurality of lens groups arranged in this order toward the eye point side from the display element side as in the example shown in FIG. 1, it is preferable that Conditional expression (1) is satisfied. Further, it is more preferable that Conditional expression (1-1) is satisfied.

$$0.1 < f/TTL < 1.1 \tag{1}$$

$$0.4 < f/TTL < 0.8 \tag{1-1}$$

Since f/TTL is made to be larger than the lower limit of Conditional expression (1), a distance between the diffractive optical element 2 and the display element 1 is easily ensured and a diopter adjustment width is easily ensured. Since f/TTL is made to be smaller than the upper limit of Conditional expression (1), a distance required to bend an off-axis principal ray can be ensured. Accordingly, it is advantageous in making the eye point high. Better characteristics can be obtained in a case where the finder optical system is adapted to satisfy Conditional expression (1-1).

Further, in a case where the focal length of the surface of the first layer 22 on which the first diffractive optical surface 22a is formed is denoted by fdoe and a composite focal length from the diffractive optical element 2 to the lens closest to the eye point side is denoted by f in the configuration where the finder optical system 10 includes the display element 1, the diffractive optical element 2, and the plurality of lenses arranged in this order toward the eye point side from the display element side, it is preferable that Conditional expression (3) is satisfied. Furthermore, it is more preferable that Conditional expression (3-1) is satisfied. In a case where the surface of the first base 21 facing the eye point side is a curved surface, fdoe is set to a value that is obtained in consideration of this curved surface as well.

$$1 < |fdoe|/f < 15 \tag{3}$$

$$2 < |fdoe|/f < 10 \tag{3-1}$$

A chromatic aberration is sensitive to fdoe. Since a chromatic aberration is also changed in a case where fdoe is changed, a chromatic aberration can be corrected by the control of fdoe. Since a ratio of fdoe to f can be suitably set in a case where Conditional expression (3) is satisfied, a lateral chromatic aberration can be corrected well. Better characteristics can be obtained in a case where the finder optical system is adapted to satisfy Conditional expression (3-1).

Further, it is preferable that the diffractive optical element 2 is fixed with respect to the display element 1 in the finder optical system 10 during the adjustment of a diopter. Since the diffractive optical element 2 can be built in a fixed component in this case, it is possible to contribute to a reduction in the size of a device. Furthermore, since the diffractive optical element 2 can function as a cover member for the display element 1, an effect of making it difficult for dust and the like to adhere to the display element 1 can also be obtained in a case where the diffractive optical element 2 is adapted to be fixed.

All the lenses, which are disposed closer to the eye point side than the diffractive optical element 2, may be adapted to be integrally moved in the direction of the optical axis during the adjustment of a diopter. Alternatively, only some of the plurality of lenses, which are disposed closer to the eye point side than the diffractive optical element 2, may be adapted to be moved in the direction of the optical axis during the adjustment of a diopter. Alternatively, some lenses and the other lenses of the plurality of lenses, which are disposed closer to the eye point side than the diffractive optical element 2, may be adapted to be moved along trajectories, which are different from each other, in the direction of the optical axis during the adjustment of a diopter.

Since the above-mentioned preferred configuration and the configuration which can be realized can be randomly combined with each other, it is preferable that the above-mentioned preferred configuration and the configuration which can be realized are appropriately selectively employed according to specifications to be required. According to this embodiment, it is possible to realize a finder optical system that can be suitably used in an electronic view finder and the like, has good optical performance since various aberrations are corrected well while a wide angle of view is achieved, and allows a finder unit to be reduced in size. "A wide angle of view", which is mentioned here, means that a horizontal field of view is 30° or more.

Next, numerical examples of the finder optical system according to the embodiment of the invention will be described.

Example 1

Since a cross-sectional view showing the configuration and optical paths of a finder optical system of Example 1 is shown in FIG. 1 and an illustrating method thereof is the same as that described above, a part of the repeated description thereof will be omitted here. FIG. 1 shows the state of a case where a diopter is −1 diopter.

The finder optical system of Example 1 includes the display element 1, the diffractive optical element 2, the first lens group G1, the second lens group G2, and the third lens group G3 that are arranged in this order toward the eye point side from the display element side. The diffractive optical element 2 has a close-contact multilayer structure where the first base 21, the first layer 22 including the first diffractive optical surface 22a, the second layer 23 including the second diffractive optical surface 23a, and the second base 24 are laminated in this order toward the eye point side from the display element side and the first diffractive optical surface 22a and the second diffractive optical surface 23a are in close contact with each other. Both surfaces of the first base 21 and both surfaces of the second base 24 are flat surfaces. The first lens group G1 consists of a positive lens L1 having a meniscus shape where a convex surface faces the eye point side in a paraxial region. The second lens group G2 consists of a negative lens L2 having a meniscus shape where a convex surface faces the eye point side. The third lens group G3 consists of a positive lens L3 having a meniscus shape where a convex surface faces the eye point side and a positive lens L4 having a meniscus shape where a convex surface faces the eye point side in a paraxial region. The summary of the finder optical system of Example 1 has been described above.

In regard to the finder optical system of Example 1, basic lens data is shown in Table 1, specifications are shown in Table 2, aspheric coefficients are shown in Table 3, and phase difference coefficients are shown in Table 4. In Table 1, a surface number is written in the column of Sn in a case where the surface number is increased toward the eye point side from the display element side one by one. A first surface and a second surface are the surfaces of the display element 1. The radius of curvature of each surface is written in the column of R, and a surface spacing between each surface and a surface, which is disposed on the eye point side of each surface so as to be adjacent to each surface, on an optical axis is written in the column of D. Further, the refractive index of each component with respect to the d line is written in the column of Nd, and the Abbe's number of each component with respect to the d line is written in the column of vd.

In Table 1, the sign of the radius of curvature of a surface having a shape where a convex surface faces the display element side is positive and the sign of the radius of curvature of a surface having a shape where a convex surface faces the eye point side is negative. In Table 1, a surface number and the expression of (EP) is written in the column of the surface number of a surface corresponding to the eye point EP.

The values of the focal length f, the horizontal field of view, and the diagonal field of view of the entire system are written in Table 2 with respect to the d line. Values in a case where a diopter is −1 diopter are written in Table 2. Here, the diagonal field of view is the field of view in a diagonal direction of the rectangular field of view. The finder optical system of Example 1 can adjust a diopter in the range of −4 diopter to +2 diopter by moving the first lens group G1, the second lens group G2, and the third lens group G3 integrally in the direction of the optical axis.

In Table 1, a mark * is given to the surface number of an aspheric surface and the numerical value of a paraxial radius of curvature is written in the column of the radius of curvature of an aspheric surface. In Table 3, the surface numbers of the aspheric surfaces are written in the columns of Sn and the numerical values of aspheric coefficients of the respective aspheric surfaces are written in the columns of KA and Am (m=3, 4, 5, . . . ). "E±n" (n: integer) of the numerical value of the aspheric coefficient of Table 3 means "×10$^{±n}$". KA and Am are the aspheric coefficients of an aspheric equation expressed by the following equation.

$$Zd = C \times h^2 / \{1 + (1 - KA \times C^2 \times h^2)^{1/2}\} + \Sigma Am \times h^m$$

Zd: the depth of an aspheric surface (the length of a perpendicular extending to a plane, which meets the apex of the aspheric surface and is perpendicular to the optical axis, from a point on the aspheric surface having a height h)

h: height (a distance between the optical axis and the lens surface)

C: paraxial curvature

KA, Am: aspheric coefficient $\Sigma$ of the aspheric equation means the sum in regard to m.

Further, in Table 1, a mark ** is given to the surface number of the diffractive optical surface. In Table 4, the surface number of the diffractive optical surface is written in the column of Sn and the numerical values of the phase difference coefficients of the diffractive optical surfaces are written in the columns of Pk (k=2, 4, 6, 8, 10). "E±n" (n: integer) of the numerical value of the phase difference coefficient of Table 4 means "×10$^{±n}$". The shape of the diffractive optical surface provided on each lens is determined by a phase difference function $\Phi(h)$ of the following equation. Pk is the phase difference coefficient of the phase difference function $\Phi(h)$ that is expressed by the following equation.

$$\Phi(h) = \Sigma Pk \times h^k$$

λ: wavelength

Pk: phase difference coefficient h: height (a distance between the optical axis and the lens surface)

$\Sigma$ of the phase difference function $\Phi(h)$ means the sum in regard to k.

A degree is used as the unit of an angle and mm (millimeter) is used as the unit of a length in the data of the respective tables, but other appropriate units can also be used since an optical system can be used even in the case of a proportional increase in size or a proportional reduction in size. Further, numerical values, which are rounded off to a predetermined place, are written in the respective tables to be described below.

TABLE 1

Example 1

| Sn | R | D | Nd | νd |
|---|---|---|---|---|
| 1 | ∞ | 0.7000 | 1.51680 | 64.20 |
| 2 | ∞ | 4.3000 | | |
| 3 | ∞ | 1.0000 | 1.49023 | 57.49 |
| 4 | ∞ | 0.0040 | 1.70854 | 34.70 |
| **5 | ∞ | 0.0000 | | |
| 6 | ∞ | 0.0040 | 1.69895 | 30.13 |
| 7 | ∞ | 1.0000 | 1.49023 | 57.49 |
| 8 | ∞ | 2.2070 | | |
| *9 | −400.0470 | 5.3452 | 1.85135 | 40.10 |
| *10 | −11.1394 | 3.3279 | | |
| 11 | −13.4479 | 0.8462 | 1.89286 | 20.36 |
| 12 | −52.1231 | 0.6000 | | |
| 13 | −65.3257 | 6.7665 | 1.90525 | 35.04 |
| 14 | −17.3839 | 0.1000 | | |
| *15 | −26.8882 | 3.6066 | 1.85135 | 40.10 |
| *16 | −26.4963 | 1.7133 | | |
| 17 | ∞ | 1.2000 | 1.51680 | 64.20 |
| 18 | ∞ | 22.5000 | | |
| 19 (EP) | ∞ | | | |

TABLE 2

Example 1

| f | 16.30 |
|---|---|
| Horizontal field of view | 34° |
| Diagonal field of view | 42° |

TABLE 3

Example 1

| Sn | 9 | 10 | 15 | 16 |
|---|---|---|---|---|
| KA | 5.0000090E+00 | −1.8475383E+00 | −4.6149513E+00 | −3.5623086E+00 |
| A3 | 0.0000000E+00 | 0.0000000E+00 | 0.0000000E+00 | 0.0000000E+00 |
| A4 | −3.5961857E−05 | 1.3354426E−04 | 3.7984240E−04 | 1.8093663E−04 |
| A5 | 8.9602487E−05 | −2.0550492E−05 | −1.1562597E−05 | 1.1051676E−05 |
| A6 | −7.8647934E−06 | 4.3810021E−06 | −7.7747174E−07 | −6.7559777E−07 |
| A7 | −1.5353333E−07 | 3.6630795E−08 | −3.0036185E−08 | −1.1671632E−07 |
| A8 | 1.6401391E−08 | −1.4938581E−08 | −5.6654011E−10 | −2.9631033E−09 |
| A9 | 1.5386251E−09 | −8.8271292E−10 | 5.8435694E−11 | 5.8586771E−12 |
| A10 | 1.5494943E−10 | −1.2472762E−11 | 6.4115697E−12 | 8.4620298E−12 |
| A11 | −1.1706456E−11 | −5.0226524E−12 | 6.6808385E−13 | 2.2443531E−12 |
| A12 | −9.8950361E−13 | −1.2244807E−12 | 4.3485250E−14 | 3.5437790E−13 |
| A13 | −2.7250842E−15 | 2.8246172E−14 | 3.7572073E−16 | 5.0268352E−15 |
| A14 | −1.3417179E−14 | −2.0520988E−15 | 1.4454509E−16 | 1.7014196E−15 |
| A15 | 2.4059085E−16 | 9.2357895E−16 | 8.8398458E−18 | −3.9017131E−17 |
| A16 | −2.0809756E−17 | 1.6470460E−16 | −1.1262230E−19 | −1.5952579E−17 |
| A17 | 9.8743917E−18 | −5.8177161E−18 | −1.0535370E−19 | −2.4804551E−18 |
| A18 | 9.6794400E−19 | −8.5517959E−20 | −2.0951124E−21 | 6.9298316E−20 |
| A19 | 6.8926581E−20 | −1.1936294E−20 | −6.3574230E−22 | 3.5533802E−21 |
| A20 | −1.3065410E−20 | −2.7560664E−21 | −4.5728821E−23 | 2.6425217E−22 |

TABLE 4

Example 1

| Sn | 5 |
|---|---|
| P2 | −5.61140554E+01 |
| P4 | 2.74225080E−01 |
| P6 | −6.98460608E−03 |
| P8 | 7.14745028E−05 |
| P10 | −1.81112901E−07 |

Figure 6:
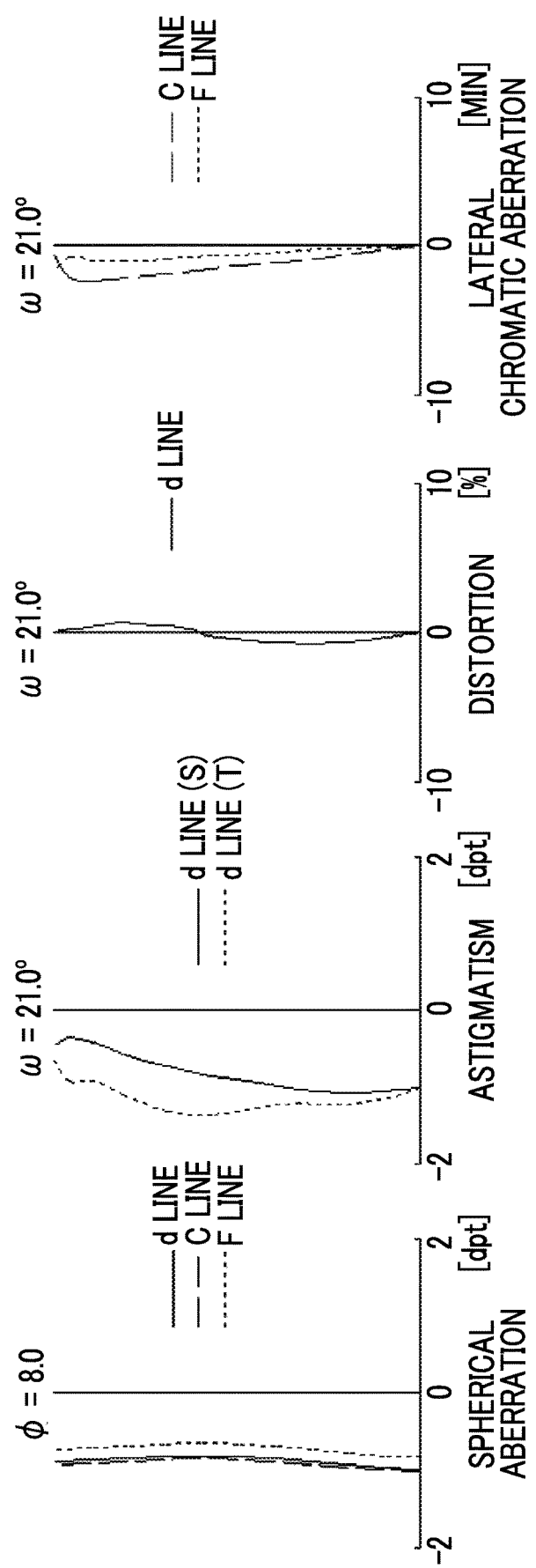
FIG. 6 is a diagram showing respective aberrations of the finder optical system of Example 1 of the invention.

FIG. 6 is a diagram showing the respective aberrations of the finder optical system of Example 1 in a case where a diopter is −1 diopter. A spherical aberration, astigmatism, distortion, and a lateral chromatic aberration are shown in FIG. 6 in this order from the left. In the diagram showing the spherical aberration, aberrations with respect to a d line, a C line, and an F line are shown by a solid line, a long-dashed line, and a short-dashed line, respectively. In the diagram showing the astigmatism, an aberration in a sagittal direction with respect to a d line is shown by a solid line and an aberration in a tangential direction with respect to a d line is shown by a short-dashed line, respectively. In the diagram showing the distortion, an aberration with respect to a d line is shown by a solid line. In the diagram showing the lateral chromatic aberration, aberrations with respect to a C line and an F line are shown by a long-dashed line and a short-dashed line, respectively. In the diagram showing the spherical aberration and the diagram showing the astigmatism, dpt of the unit of a horizontal axis means a diopter. ϕ in the diagram showing the spherical aberration means the diameter of an eye point in a case where mm is used as a unit. That is, "ϕ=8.0" means that the diameter of a pupil is set to 8.0 mm. ω in the diagrams showing the other aberrations means the half angle of a diagonal field of view.

Since the symbols, meanings, writing methods, illustrating methods for data about Example 1 are the same as those of other examples to be described below unless otherwise specified, the repeated description thereof will be omitted below. Each data of examples to be described below is data in a case where a diopter is −1 diopter.

Example 2

Figure 3:
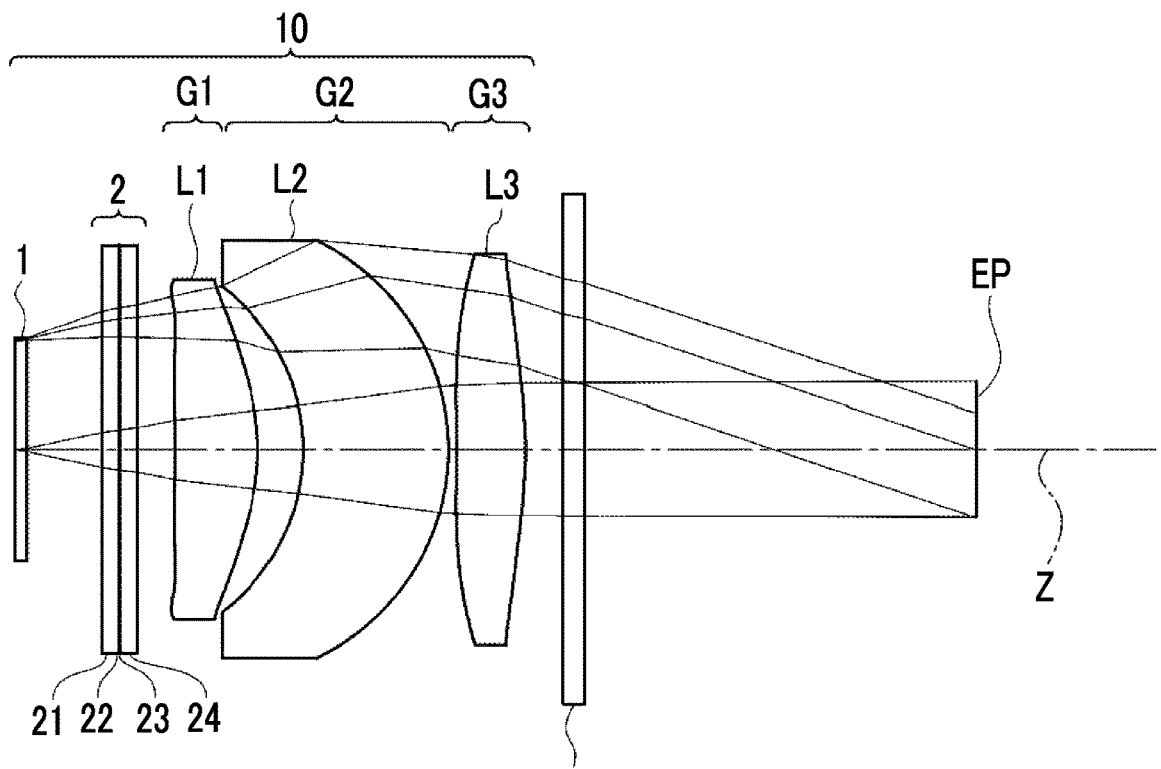
FIG. 3 is a cross-sectional view showing a configuration of a finder optical system of Example 2 of the invention and luminous flux.
Figure 7:
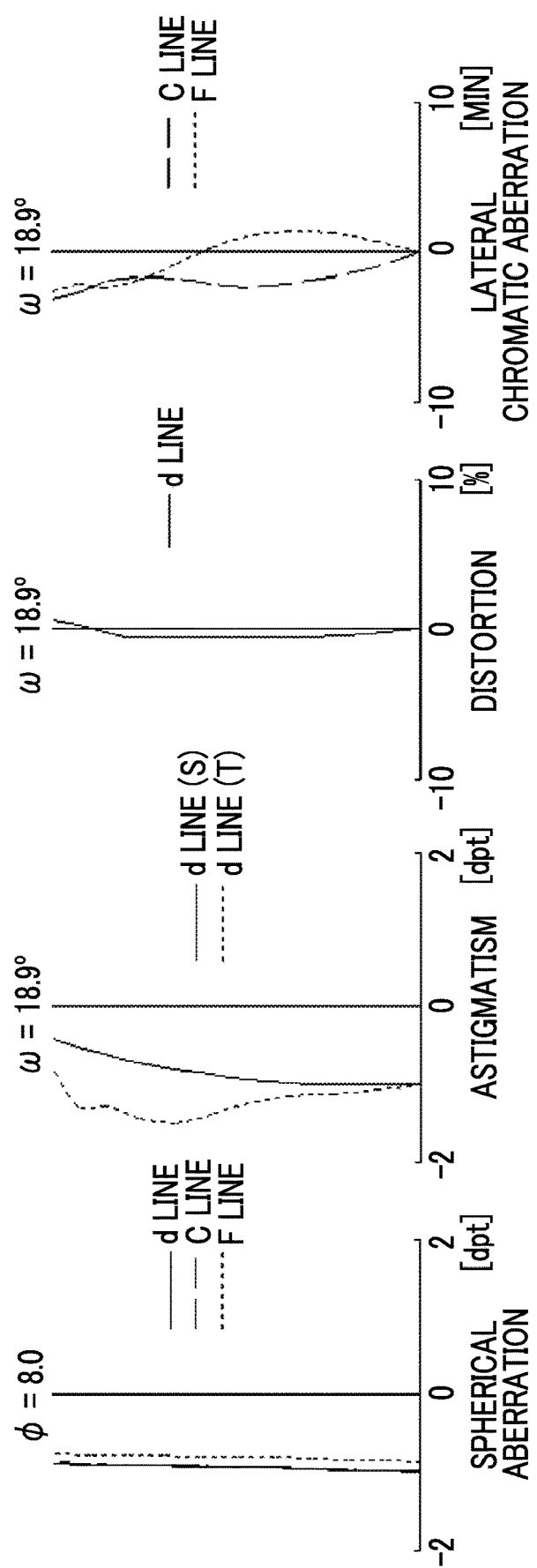
FIG. 7 is a diagram showing respective aberrations of the finder optical system of Example 2 of the invention.

A cross-sectional view showing the configuration and optical paths of a finder optical system of Example 2 is shown in FIG. 3. The finder optical system of Example 2 has basically the same configuration as the finder optical system of Example 1, but is different from the Example 1 in that a second lens group G2 consists of a positive lens L2 having a meniscus shape where a convex surface faces the eye point side and a third lens group G3 consists of only a positive lens L3 having a meniscus shape where a convex surface faces the eye point side in a paraxial region. In regard to the finder optical system of Example 2, basic lens data is shown in Table 5, specifications are shown in Table 6, aspheric coefficients are shown in Table 7, phase difference coefficients are shown in Table 8, and a diagram showing the respective aberrations is shown in FIG. 7. The finder optical system of Example 2 can adjust a diopter in the range of −4 diopter to +2 diopter by moving the first lens group G1, the second lens group G2, and the third lens group G3 integrally in the direction of the optical axis.

TABLE 5

Example 2

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 1.0000 | 1.49023 | 57.49 |
| 4 | ∞ | 0.0040 | 1.70748 | 34.13 |
| **5 | ∞ | 0.0000 | | |
| 6 | ∞ | 0.0040 | 1.69895 | 30.13 |
| 7 | ∞ | 1.0000 | 1.49023 | 57.49 |
| 8 | ∞ | 2.2070 | | |
| *9 | −86.5745 | 4.7990 | 1.61283 | 60.66 |
| *10 | −12.7279 | 2.5888 | | |
| 11 | −12.1938 | 8.3668 | 1.53792 | 63.54 |
| 12 | −13.7665 | 0.4505 | | |
| *13 | −153.6327 | 3.9689 | 1.54040 | 63.45 |
| *14 | −29.6471 | 2.1191 | | |
| 15 | ∞ | 1.2000 | 1.51680 | 64.20 |
| 16 | ∞ | 22.5000 | | |
| 17 (EP) | ∞ | | | |

TABLE 6

Example 2

| | |
|---|---|
| f | 18.51 |
| Horizontal field of view | 33° |
| Diagonal field of view | 38° |

TABLE 7

Example 2

| Sn | 9 | 10 | 13 | 14 |
|---|---|---|---|---|
| KA | 4.9999985E+00 | −2.2233393E+00 | 5.0000000E+00 | −1.0946974E+00 |
| A3 | 0.0000000E+00 | 0.0000000E+00 | 0.0000000E+00 | 0.0000000E+00 |
| A4 | −2.3060848E−05 | 1.1284615E−04 | 2.0705108E−04 | 1.0478098E−04 |
| A5 | 8.1623280E−05 | −1.9310829E−05 | −7.4762226E−06 | 4.7800929E−06 |
| A6 | −8.8262442E−06 | 3.7729410E−06 | −2.8417164E−07 | −6.4912011E−07 |
| A7 | −1.4308558E−07 | −5.7694303E−08 | −1.0806669E−08 | −7.5241214E−08 |
| A8 | 1.4034102E−08 | −2.1111461E−08 | −1.2626809E−09 | 1.3969040E−09 |
| A9 | 2.4270934E−09 | −1.0797882E−09 | 7.0615848E−11 | 2.9960613E−10 |
| A10 | 4.1151780E−11 | 2.2086171E−11 | −1.5520175E−12 | 1.5962109E−11 |
| A11 | −2.3840204E−11 | 2.0835655E−12 | 1.3330652E−12 | −2.9244917E−13 |
| A12 | −5.2008388E−13 | −6.9000868E−13 | 8.4029871E−15 | 1.1982699E−13 |
| A13 | −2.6972687E−15 | 8.6130757E−14 | 3.4061363E−15 | −9.2751481E−15 |
| A14 | −1.8291056E−14 | 7.9998689E−16 | 2.5275853E−16 | 6.3787886E−16 |
| A15 | 1.8489724E−15 | 9.7657353E−16 | 1.5167709E−17 | −3.6348958E−17 |
| A16 | −1.4114817E−16 | 1.4255119E−16 | −3.3992023E−18 | −8.9361136E−18 |
| A17 | 2.0621647E−17 | −1.1687750E−17 | −6.2617332E−19 | −1.5581049E−18 |
| A18 | 1.4979878E−18 | −7.9308695E−19 | −1.8471520E−20 | 1.3828692E−19 |
| A19 | 1.4552015E−19 | −4.5240187E−20 | 3.5849534E−23 | 4.1090907E−21 |
| A20 | −2.1009520E−20 | 6.9104608E−21 | 3.4858117E−22 | −1.7039501E−22 |

TABLE 8

Example 2

| Sn | 5 |
|---|---|
| P2 | −1.06910599E+02 |
| P4 | 1.64280062E+00 |
| P6 | −3.04507350E−02 |
| P8 | 1.55201231E−04 |
| P10 | 4.82389308E−07 |

Example 3

Figure 4:
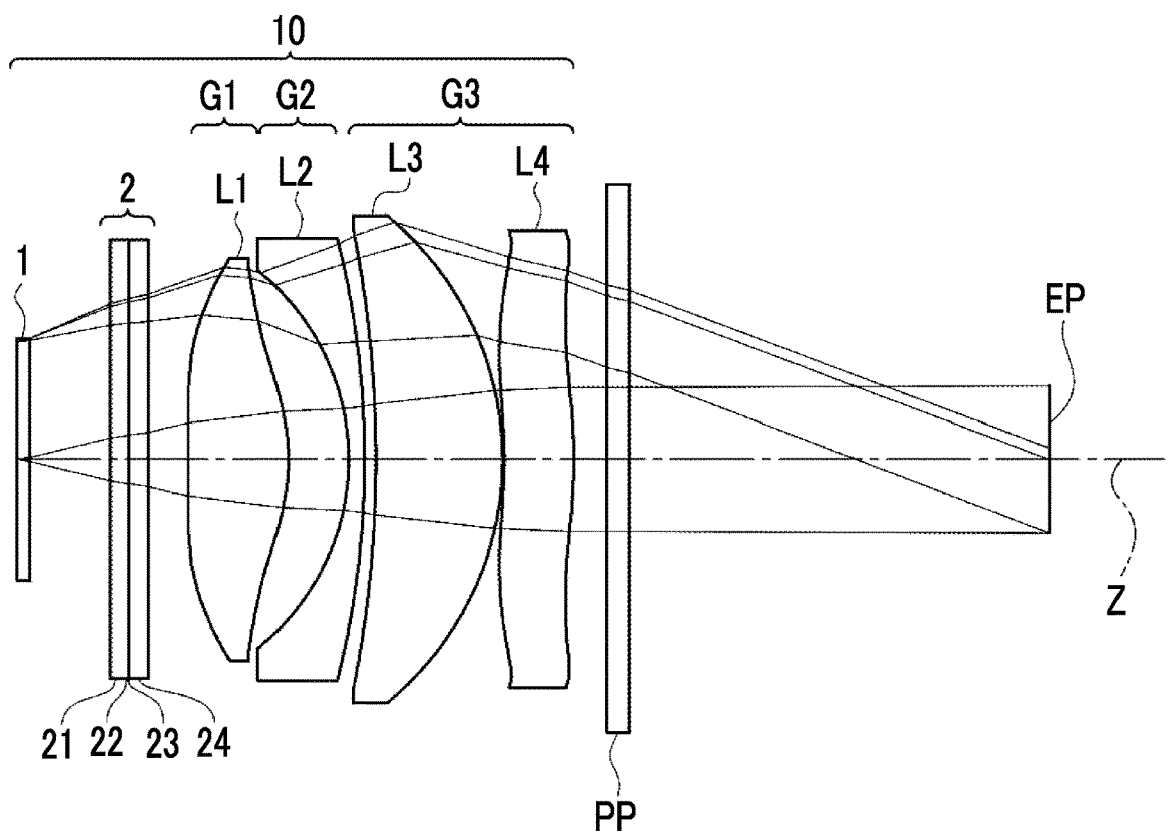
FIG. 4 is a cross-sectional view showing a configuration of a finder optical system of Example 3 of the invention and luminous flux.
Figure 8:
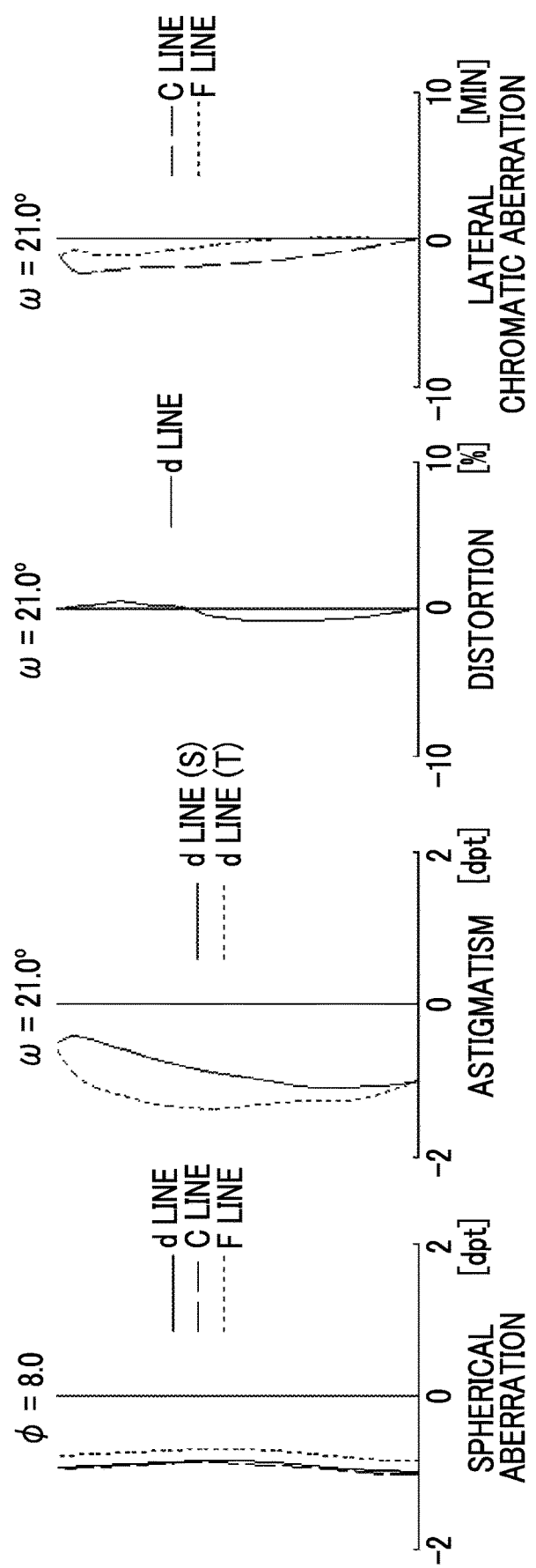
FIG. 8 is a diagram showing respective aberrations of the finder optical system of Example 3 of the invention.

A cross-sectional view showing the configuration and optical paths of a finder optical system of Example 3 is shown in FIG. 4. The finder optical system of Example 3 has the same configuration as the finder optical system of Example 1. In regard to the finder optical system of Example 3, basic lens data is shown in Table 9, specifications are shown in Table 10, aspheric coefficients are shown in Table 11, phase difference coefficients are shown in Table 12, and a diagram showing the respective aberrations is shown in FIG. 8. The finder optical system of Example 3 can adjust a diopter in the range of −4 diopter to +2 diopter by moving the first lens group G1, the second lens group G2, and the third lens group G3 integrally in the direction of the optical axis.

TABLE 9

Example 3

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 1.0000 | 1.49023 | 57.49 |
| 4 | ∞ | 0.0040 | 1.70842 | 34.63 |
| **5 | ∞ | 0.0000 | | |
| 6 | ∞ | 0.0040 | 1.69895 | 30.13 |
| 7 | ∞ | 1.0000 | 1.49023 | 57.49 |
| 8 | 5000.0000 | 2.2070 | | |
| *9 | −454.1618 | 5.3676 | 1.85135 | 40.10 |
| *10 | −11.2017 | 3.2101 | | |
| 11 | −13.3876 | 0.8475 | 1.89286 | 20.36 |
| 12 | −50.9592 | 0.6000 | | |
| 13 | −66.4733 | 6.7665 | 1.90525 | 35.04 |
| 14 | −17.4774 | 0.1000 | | |
| *15 | −26.8883 | 3.6877 | 1.85135 | 40.10 |
| *16 | −26.4618 | 1.7228 | | |
| 17 | ∞ | 1.2000 | 1.51680 | 64.20 |
| 18 | ∞ | 22.5000 | | |
| 19 (EP) | ∞ | | | |

TABLE 10

Example 3

| | |
|---|---|
| f | 16.30 |
| Horizontal field of view | 34° |
| Diagonal field of view | 42° |

TABLE 11

Example 3

| Sn | 9 | 10 | 15 | 16 |
|---|---|---|---|---|
| KA | 5.0000031E+00 | −1.8274321E+00 | −4.9999906E+00 | −4.9631090E+00 |
| A3 | 0.0000000E+00 | 0.0000000E+00 | 0.0000000E+00 | 0.0000000E+00 |
| A4 | −3.7548077E−05 | 1.4072469E−04 | 3.7443889E−04 | 1.6910732E−04 |
| A5 | 8.9725050E−05 | −2.0369730E−05 | −1.1244252E−05 | 1.0911263E−05 |
| A6 | −7.8550043E−06 | 4.3639634E−06 | −7.7088166E−07 | −6.4564359E−07 |
| A7 | −1.5296834E−07 | 3.5142199E−08 | −3.0432222E−08 | −1.1322419E−07 |
| A8 | 1.6425401E−08 | −1.5089037E−08 | −5.6015957E−10 | −2.8643821E−09 |
| A9 | 1.5366756E−09 | −9.2868965E−10 | 5.9006859E−11 | 1.6045700E−11 |
| A10 | 1.5409508E−10 | −1.4170120E−11 | 6.4825717E−12 | 1.0261878E−11 |
| A11 | −1.1881923E−11 | −4.7601886E−12 | 7.0375498E−13 | 1.7911362E−12 |
| A12 | −9.9283713E−13 | −1.2348710E−12 | 4.3182853E−14 | 3.5855961E−13 |
| A13 | −2.6916271E−15 | 3.0200748E−14 | 4.7716049E−16 | 5.3425147E−15 |
| A14 | −1.3404867E−14 | −1.7919322E−15 | 1.4219753E−16 | 1.5411996E−15 |
| A15 | 2.4382751E−16 | 9.2009809E−16 | 1.0377700E−17 | −3.6870276E−17 |
| A16 | −2.0312016E−17 | 1.6388687E−16 | −2.2890948E−20 | −1.5532294E−17 |
| A17 | 9.9333059E−18 | −5.8938800E−18 | −2.2835678E−19 | −2.4739641E−18 |
| A18 | 9.6724075E−19 | −7.7523000E−20 | −4.5300997E−23 | 8.0087424E−20 |
| A19 | 6.9320698E−20 | −1.2594508E−20 | −3.7418479E−22 | 2.8509521E−21 |
| A20 | −1.3100837E−20 | −2.7061754E−21 | −2.8924966E−23 | 2.7326097E−22 |

TABLE 12

Example 3

| Sn | 5 |
|---|---|
| P2 | −5.87109379E+01 |
| P4 | 2.91179422E−01 |
| P6 | −6.13889133E−03 |
| P8 | 5.68312651E−05 |
| P10 | −1.23877803E−07 |

Example 4

Figure 5:
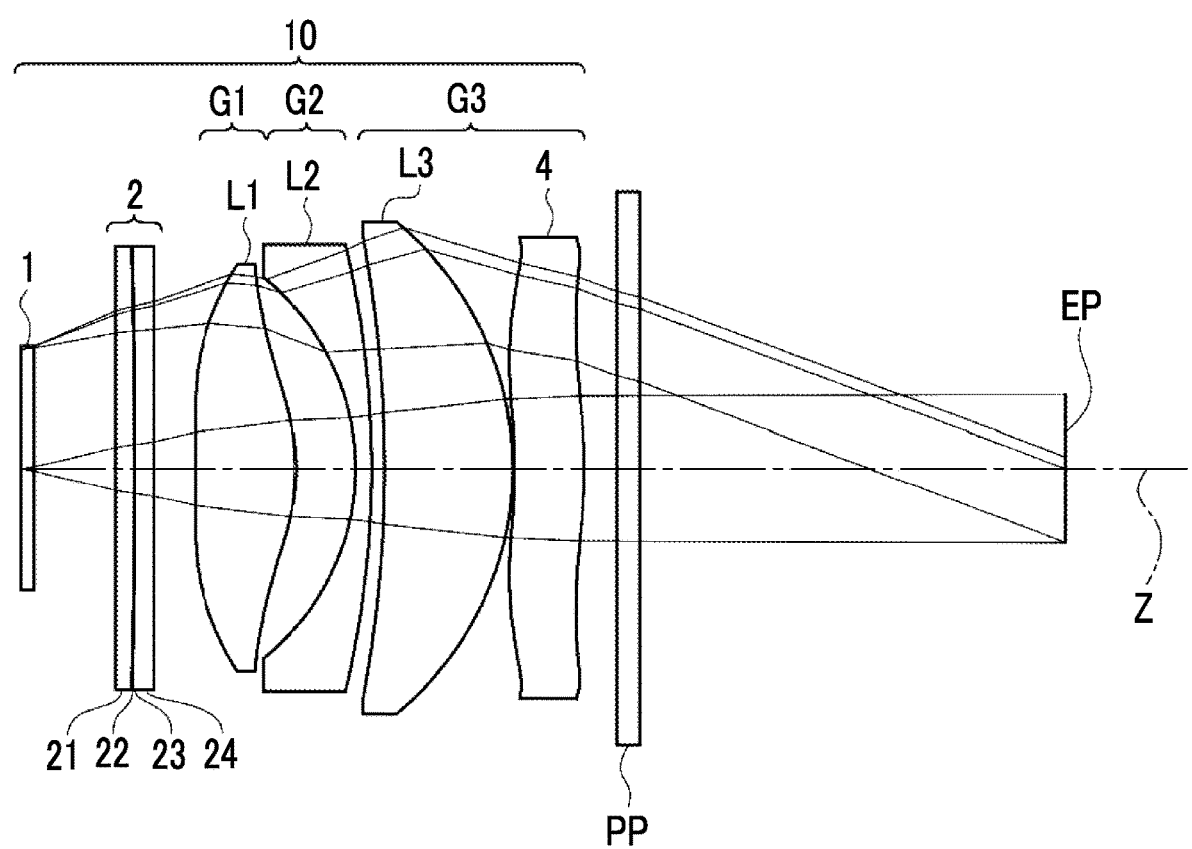
FIG. 5 is a cross-sectional view showing a configuration of a finder optical system of Example 4 of the invention and luminous flux.
Figure 9:
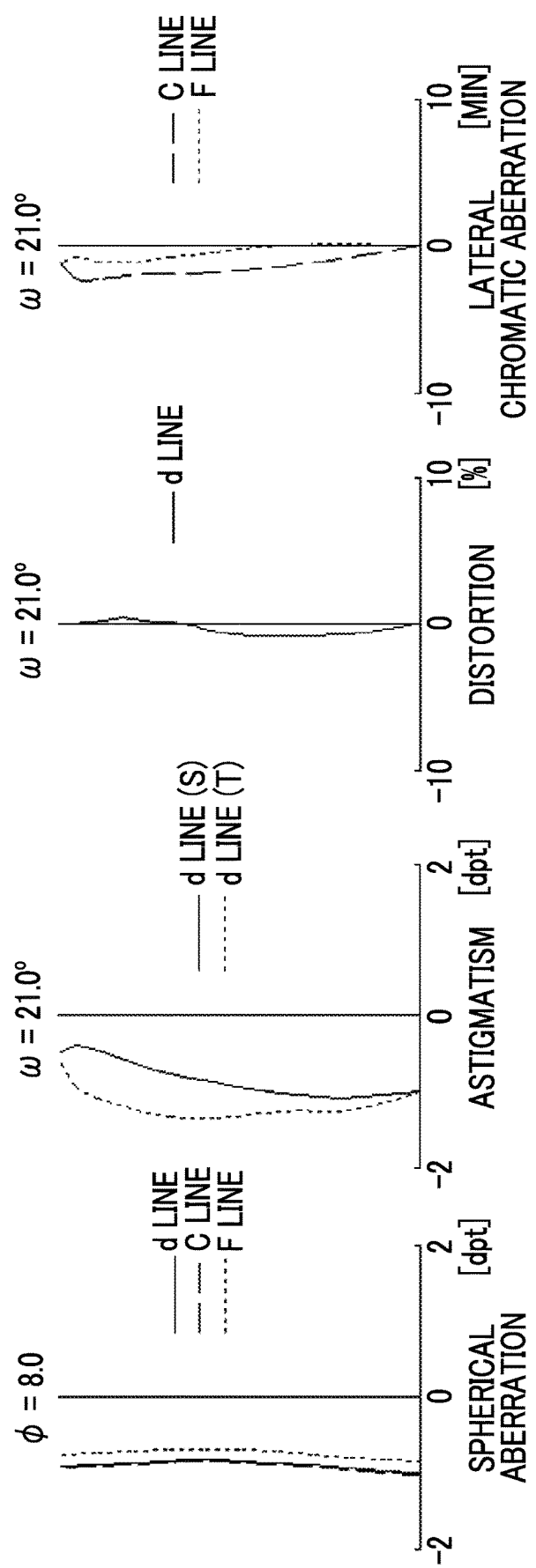
FIG. 9 is a diagram showing respective aberrations of the finder optical system of Example 3 of the invention.

A cross-sectional view showing the configuration and optical paths of a finder optical system of Example 4 is shown in FIG. 5. The finder optical system of Example 4 has basically the same configuration as the finder optical system of Example 1, but is different from the Example 1 in that the surface of a first base 21 facing the eye point side and the surface of a second base 24 facing the display element side are curved surfaces. In regard to the finder optical system of Example 4, basic lens data is shown in Table 13, specifications are shown in Table 14, aspheric coefficients are shown in Table 15, phase difference coefficients are shown in Table 16, and a diagram showing the respective aberrations is shown in FIG. 9. The finder optical system of Example 4 can adjust a diopter in the range of −4 diopter to +2 diopter by moving the first lens group G1, the second lens group G2, and the third lens group G3 integrally in the direction of the optical axis.

TABLE 13

Example 4

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 1.0000 | 1.49023 | 57.49 |
| 4 | −500.0000 | 0.0040 | 1.70822 | 34.52 |
| **5 | −500.0000 | 0.0000 | | |
| 6 | −500.0000 | 0.0040 | 1.69895 | 30.13 |
| 7 | −500.0000 | 1.0000 | 1.49023 | 57.49 |
| 8 | ∞ | 2.2070 | | |
| *9 | −456.0348 | 5.3571 | 1.85135 | 40.10 |
| *10 | −11.1921 | 3.1222 | | |
| 11 | −13.4456 | 0.8485 | 1.89286 | 20.36 |
| 12 | −53.7238 | 0.6816 | | |
| 13 | −69.4865 | 6.7665 | 1.90525 | 35.04 |
| 14 | −17.5553 | 0.1000 | | |

TABLE 13-continued

Example 4

| Sn | R | D | Nd | vd |
|---|---|---|---|---|
| *15 | −26.8882 | 3.6894 | 1.85135 | 40.10 |
| *16 | −26.4582 | 1.7338 | | |
| 17 | ∞ | 1.2000 | 1.51680 | 64.20 |
| 18 | ∞ | 22.5000 | | |
| 19 (EP) | ∞ | | | |

TABLE 14

Example 4

| | |
|---|---|
| f | 16.30 |
| Horizontal field of view | 34° |
| Diagonal field of view | 42° |

TABLE 15

Example 4

| Sn | 9 | 10 | 15 | 16 |
|---|---|---|---|---|
| KA | 5.0000000E+00 | −1.8796326E+00 | 5.0000085E+00 | −4.5106840E+00 |
| A3 | 0.0000000E+00 | 0.0000000E+00 | 0.0000000E+00 | 0.0000000E+00 |
| A4 | −3.6400904E−05 | 1.3880141E−04 | 3.7236533E−04 | 1.7007229E−04 |
| A5 | 8.9703654E−05 | −2.0467878E−05 | −1.1183507E−05 | 1.0913815E−05 |
| A6 | −7.8589686E−06 | 4.3693659E−06 | −7.6622944E−07 | −6.4375270E−07 |
| A7 | −1.5328068E−07 | 3.5616651E−08 | −3.0117000E−08 | −1.1361527E−07 |
| A8 | 1.6402208E−08 | −1.5049261E−08 | −5.5589395E−10 | −2.8179574E−09 |
| A9 | 1.5348043E−09 | −9.3469917E−10 | 6.0644652E−11 | 1.8066089E−11 |
| A10 | 1.5398781E−10 | −1.4298133E−11 | 6.4209686E−12 | 1.0122582E−11 |
| A11 | −1.1770358E−11 | −4.7479347E−12 | 7.1205807E−13 | 1.7209812E−12 |
| A12 | −9.9471750E−13 | −1.2369048E−12 | 4.2289927E−14 | 3.6162409E−13 |
| A13 | −2.6920458E−15 | 3.0345702E−14 | 3.1635821E−16 | 5.4499570E−15 |
| A14 | −1.3418342E−14 | −1.7780241E−15 | 1.3358838E−16 | 1.5590973E−15 |
| A15 | 2.4290915E−16 | 9.2214911E−16 | 9.7441610E−18 | −3.6906018E−17 |
| A16 | −2.0377313E−17 | 1.6422720E−16 | −1.2436995E−19 | −1.5563167E−17 |
| A17 | 9.9301270E−18 | −5.9220516E−18 | −1.9955297E−19 | −2.4789199E−18 |
| A18 | 9.6752084E−19 | −7.9297237E−20 | −2.2302927E−22 | 7.6755634E−20 |
| A19 | 6.9432858E−20 | −1.2605171E−20 | −4.0644484E−22 | 2.9658254E−21 |
| A20 | −1.3099954E−20 | −2.7021944E−21 | −2.9341464E−23 | 2.8600577E−22 |

TABLE 16

Example 4

| Sn | 5 |
|---|---|
| P2 | −6.06051601E+01 |
| P4 | 3.43896922E−01 |
| P6 | −6.51401717E−03 |
| P8 | 5.45687803E−05 |
| P10 | −9.47625953E−08 |

The values of Conditional expressions (1) to (3) corresponding to the finder optical systems of Examples 1 to 4 are shown in Table 17. In Examples 1 to 4, a d line is used as a reference wavelength. Table 17 shows values with respect to a d line.

TABLE 17

| Sn | | Example 1 | Example 2 | Example 3 | Example 4 |
|---|---|---|---|---|---|
| (1) | f/TTL | 0.55 | 0.63 | 0.55 | 0.55 |
| (2) | Δvd/ΔNd | 476.27 | 465.48 | 475.38 | 474.08 |
| (3) | |fdoe|/f | 5.85 | 2.70 | 5.59 | 4.81 |

As known from the above-mentioned data, in each of the finder optical systems of Examples 1 to 4, the number of lenses of the entire system is three or four, that is, a small number of lenses are provided, the horizontal field of view is 33° or more, and a wide angle of view is achieved. Since various aberrations including a chromatic aberration are corrected well, each of the finder optical systems of Examples 1 to 4 has high optical performance. Since the entire length of each finder optical system is reduced, each finder optical system is made small.

Figure 10:
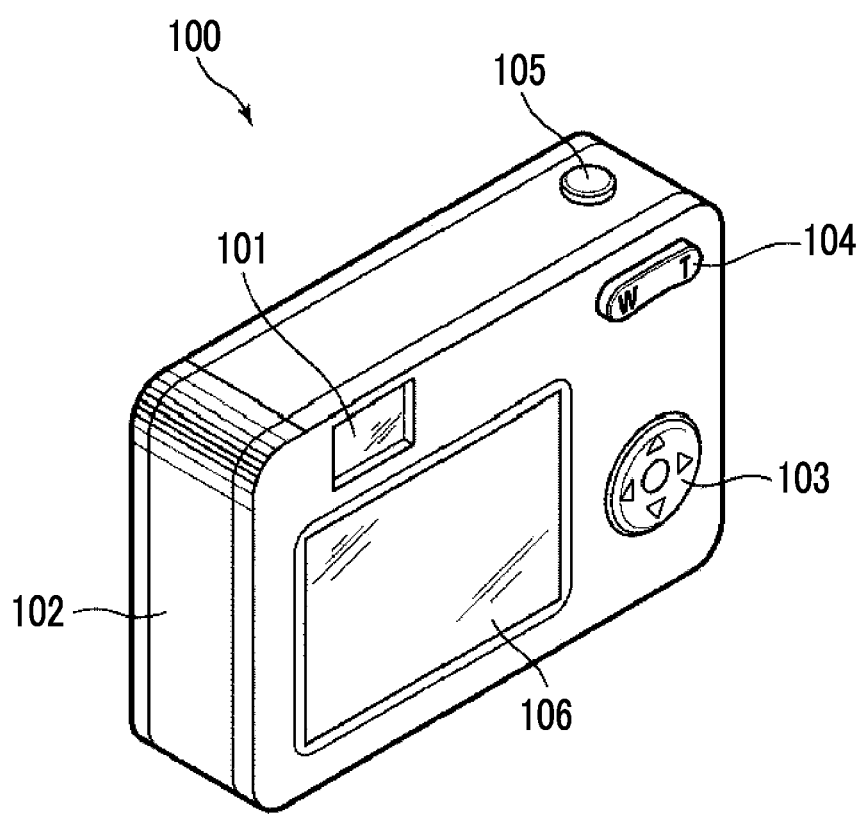
FIG. 10 is a perspective view showing the back side of an imaging device according to an embodiment of the invention.

Next, an imaging device according to an embodiment of the invention will be described. FIG. 10 is a perspective view showing the schematic structure of the back side of a camera 100 according to an embodiment of the imaging device of the invention. The camera 100 includes a finder 101 that is provided at an upper portion of a camera body 102. The finder 101 includes the finder optical system according to the embodiment of the invention. Further, the camera 100 includes an operation button 103 that is provided on the back of the camera body 102 and is used to perform various settings, a zoom lever 104 that is used to change a magnification, and a monitor 106 that displays images or various setting screens. The camera 100 includes a shutter button 105 that is provided on the upper surface of the camera body 102. In the camera 100, a subject image, which is taken by an imaging lens provided on the front of the camera body 102, is formed on the imaging surface of an imaging element (not shown). The subject image formed on the imaging surface is displayed on a display element (not shown), which is included in the finder 101, as a finder image, and a user looks into the finder 101 from the back side to observe the finder image of a subject. An example of the finder built in the camera 100 has been shown in FIG. 10, but the invention can also be applied to an external finder. Furthermore, the imaging device according to the embodiment of the invention is not limited to the example shown in FIG. 10, and the invention can also be applied to, for example, a video camera and the like.

The invention has been described above using the embodiments and the examples, but the invention may have various modifications without being limited to the embodiments and the examples. For example, the radius of curvature, the surface spacing, the refractive index, the Abbe's number, the aspheric coefficient, and the like of each lens may have other values without being limited to values shown in the respective numerical examples.

What is claimed is:

1. A finder optical system comprising:
    a display element; and
    a diffractive optical element that is disposed on an eye point side of the display element so as to continue from the display element,
    wherein the diffractive optical element consists of, a first base, a first layer that is laminated on the first base and that includes a first diffractive optical surface on a surface thereof opposite to the first base, a second base, and a second layer that is laminated on the second base and that includes a second diffractive optical surface on a surface thereof opposite to the second base,
    the first layer and the second layer are disposed so as to face each other, and
    the first diffractive optical surface and the second diffractive optical surface are in contact with each other within the diffractive optical element.

2. The finder optical system according to claim 1, further comprising:
    a positive lens which is disposed on an eye point side of the diffractive optical element so as to continue from the diffractive optical element and of which a convex surface faces an eye point side.

3. The finder optical system according to claim 1, consisting of:
    the display element;
    the diffractive optical element; and
    a plurality of lens groups that are disposed on an eye point side of the diffractive optical element,
    wherein the plurality of lens groups consist of a first lens group, a second lens group, and a third lens group that are arranged in this order toward the eye point side from a display element side, and
    the first lens group consists of a positive lens, the second lens group consists of a single lens, and the third lens group includes a positive lens, which is disposed closest to the eye point side and of which a convex surface faces the eye point side, and has positive refractive power as a whole.

4. The finder optical system according to claim 1, further comprising:
    a plurality of lens groups that are disposed on an eye point side of the diffractive optical element,
    wherein Conditional expression (1) is satisfied in a case where a composite focal length from the diffractive optical element to the lens closest to the eye point side is denoted by f and a distance between a surface of the display element opposite to the eye point side and a surface of the lens, which is closest to the eye point side, facing the eye point side on an optical axis is denoted by TTL, $$0.1 < f/TTL < 1.1 \tag{1}.$$

5. The finder optical system according to claim 4, wherein Conditional expression (1-1) is satisfied, $$0.4 < f/TTL < 0.8 \tag{1-1}.$$

6. The finder optical system according to claim 1, wherein the diffractive optical element includes at least one flat surface.

7. The finder optical system according to claim 1, wherein Conditional expression (2) is satisfied in a case where an absolute value of a difference between an Abbe's number of the first layer with respect to a d line and an Abbe's number of the second layer with respect to the d line is denoted by $\Delta vd$ and an absolute value of a difference between a refractive index of the first layer with respect to the d line and a refractive index of the second layer with respect to the d line is denoted by $\Delta Nd$, $$100 < \Delta vd/\Delta Nd < 850 \tag{2}.$$

8. The finder optical system according to claim 7, wherein Conditional expression (2-1) is satisfied, $$200 < \Delta vd/\Delta Nd < 750 \tag{2-1}.$$

9. The finder optical system according to claim 1, further comprising:
    a plurality of lens groups that are disposed on an eye point side of the diffractive optical element,
    wherein Conditional expression (3) is satisfied in a case where a focal length of a surface of the first layer on which the first diffractive optical surface is formed is denoted by fdoe and a composite focal length from the diffractive optical element to the lens closest to the eye point side is denoted by f, $$1 < |fdoe|/f < 15 \tag{3}$$

10. The finder optical system according to claim 9, wherein Conditional expression (3-1) is satisfied, $$2 < |fdoe|/f < 10 \tag{3-1}$$

11. The finder optical system according to claim 1, further comprising:
    a lens that is disposed on an eye point side of the diffractive optical element so as to continue from the diffractive optical element and includes at least one aspheric surface.

12. The finder optical system according to claim 1, consisting of:
    the display element;
    the diffractive optical element; and
    a plurality of lens groups that are disposed on an eye point side of the diffractive optical element,
    wherein the plurality of lens groups consist of a first lens group, a second lens group, and a third lens group that are arranged in this order toward the eye point side from the display element side, and
    the first lens group consists of a positive lens, the second lens group consists of a negative lens of which a convex surface faces the eye point side, and the third lens group has positive refractive power as a whole.

13. The finder optical system according to claim 1, consisting of:
    the display element;
    the diffractive optical element; and
    four or less lenses that are disposed on an eye point side of the diffractive optical element.

14. The finder optical system according to claim 1, consisting of:
- the display element;
- the diffractive optical element; and
- a plurality of lens groups that are disposed on an eye point side of the diffractive optical element,
- wherein the plurality of lens groups consist of a first lens group, a second lens group, and a third lens group that are arranged in this order toward the eye point side from the display element side, and
- the first lens group consists of a positive lens, the second lens group consists of a single lens, and the third lens group consists of two or less positive lenses of which convex surfaces face the eye point side.

15. The finder optical system according to claim 1, wherein the diffractive optical element is fixed with respect to the display element during adjustment of a diopter.

16. An imaging device comprising:
the finder optical system according to claim 1.

* * * * *